United States Patent [19]

de Kanter

[11] 4,112,627
[45] Sep. 12, 1978

[54] GLASS CYLINDER SUBDIVIDING APPARATUS AND METHOD

[75] Inventor: Hendrik de Kanter, Santa Ana, Calif.

[73] Assignee: DKA, Inc., Marina Del Rey, Calif.

[21] Appl. No.: 789,338

[22] Filed: Apr. 20, 1977

[51] Int. Cl.² .................. B24B 1/00; B24B 5/50
[52] U.S. Cl. .................. 51/79; 51/103 WH; 51/283 R; 82/102
[58] Field of Search ............ 51/79, 103 WH, 103 TF, 51/215 HM, 283, 99, 290; 83/411 R; 82/47, 86, 87, 102

[56] References Cited

U.S. PATENT DOCUMENTS

| | | | |
|---|---|---|---|
| 1,384,756 | 7/1921 | Hambuechen | 51/215 HM |
| 1,594,821 | 9/1926 | Dulligan | 51/215 HM |
| 1,641,222 | 9/1927 | Foisy | 83/411 R X |
| 2,256,146 | 9/1941 | Knott | 83/411 R |
| 2,475,009 | 7/1949 | Catucci | 51/79 |
| 2,810,438 | 10/1957 | Stone | 83/411 R |
| 3,797,338 | 3/1974 | Molnar | 83/411 R |
| 3,872,628 | 3/1975 | Dunn | 51/215 HM |
| 3,889,428 | 6/1975 | Steinegger | 51/215 HM |

*Primary Examiner*—N. P. Godici
*Attorney, Agent, or Firm*—Richard L. Gausewitz

[57] ABSTRACT

Small-diameter vitreous cylinders, for example glass tubes, are maintained under lateral (radial) compression and are precision rolled through grinding wheels, thus fully separating the cylinders into as many cylindrical components as desired. The rolling is effected by maintaining several glass cylinders in laterally-adjacent relationship between a drive roller and a pressure sheet, the latter being under very substantial tension. Thin grinder wheels extend through slots in the pressure sheet and thereby grind completely through the rolling cylinders. The drive roller and pressure sheet continue to roll the substantially separated cylinders, in precise synchronism, so that there is no breaking but instead only grinding.

55 Claims, 9 Drawing Figures

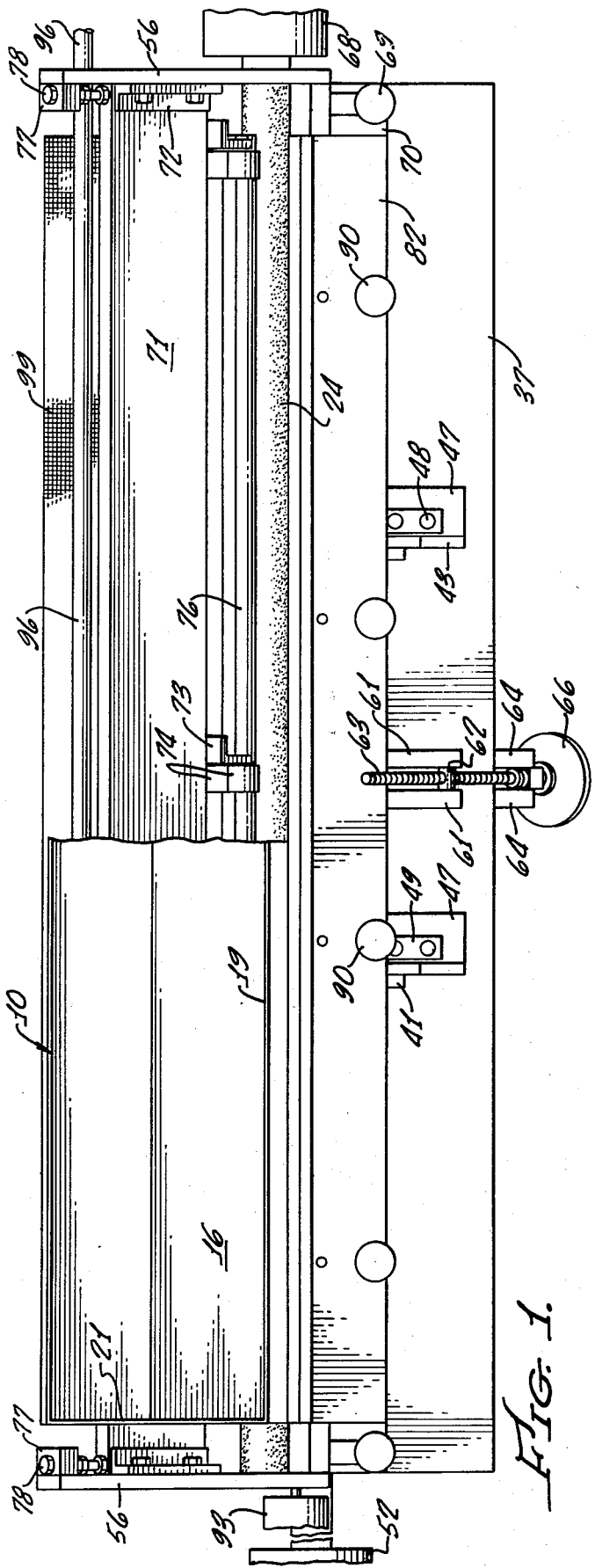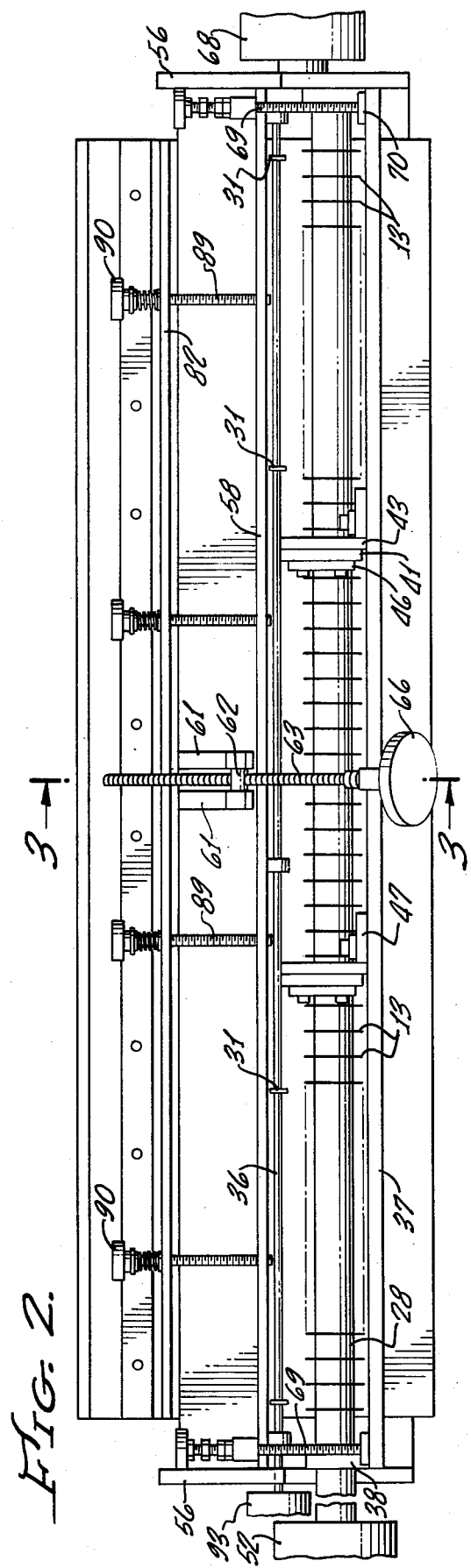

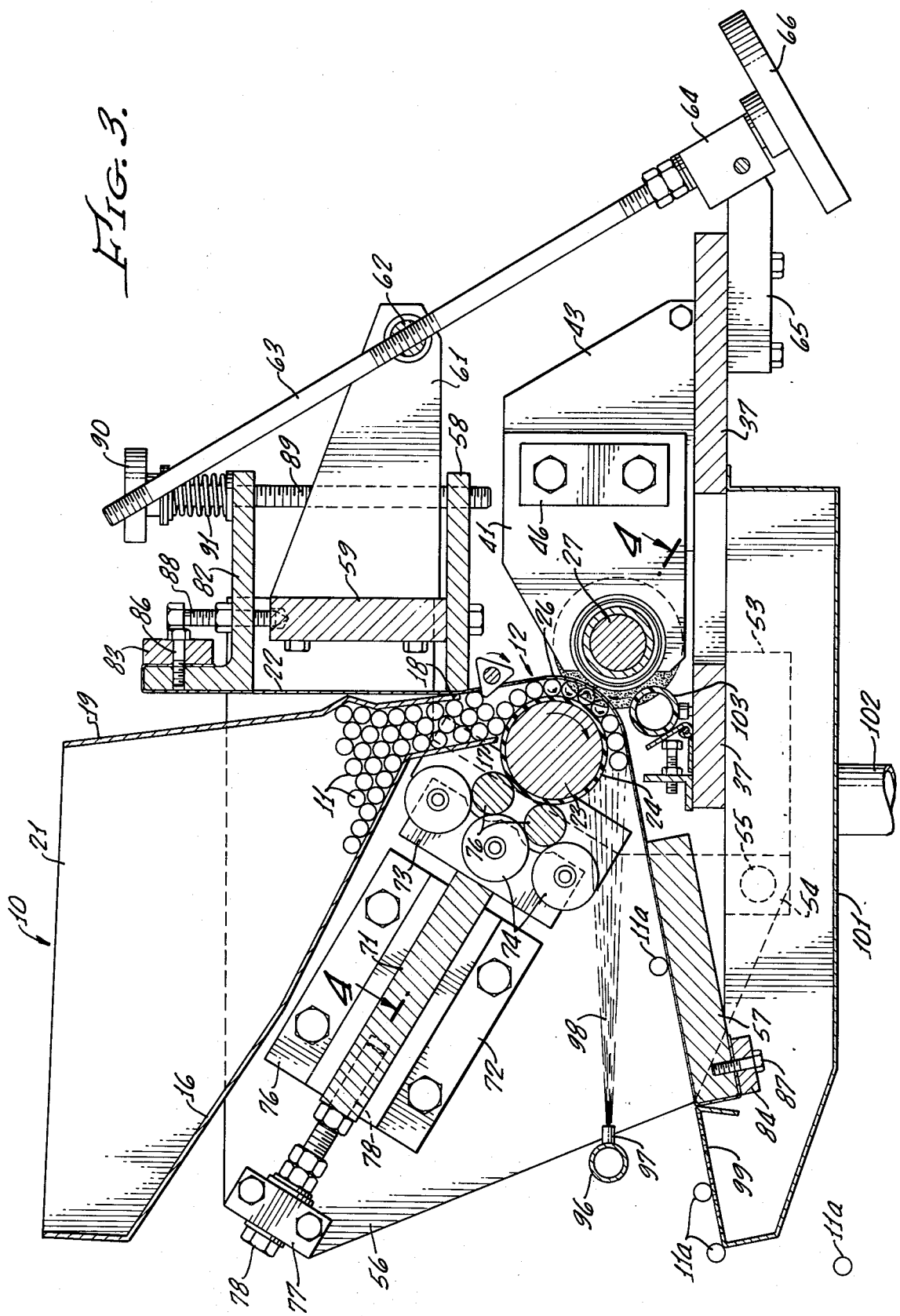

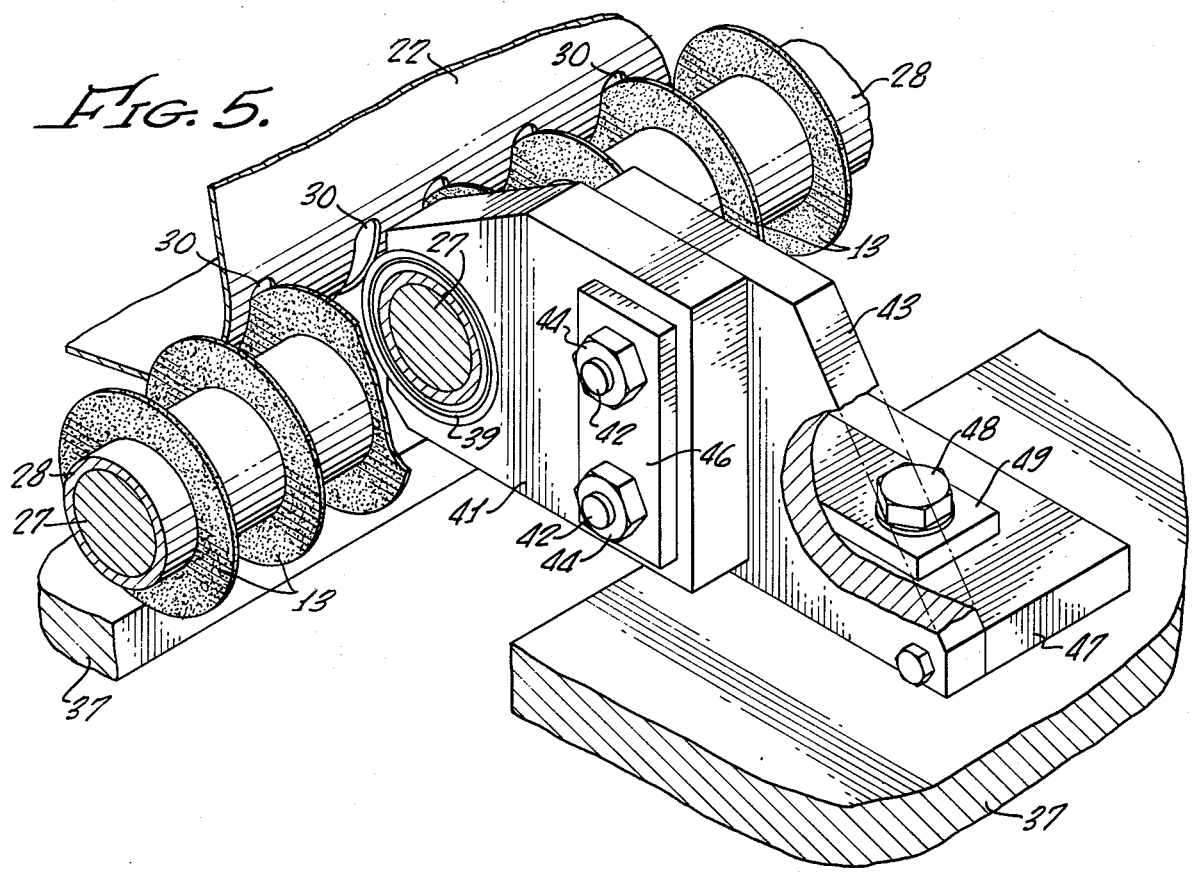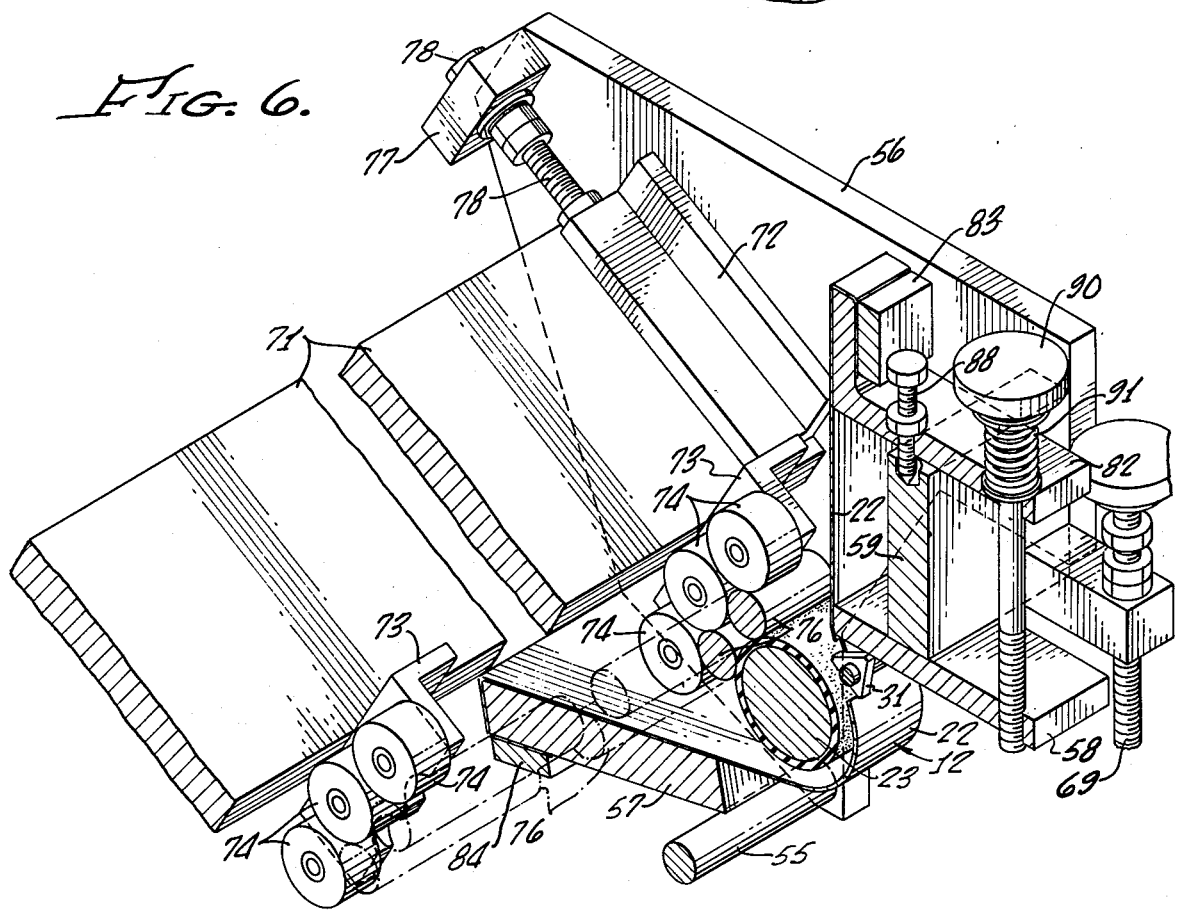

GLASS CYLINDER SUBDIVIDING APPARATUS AND METHOD

BACKGROUND OF THE INVENTION

1. Field of the Invention

This invention relates to the field of the precision separation of relatively small-diameter vitreous cylinders into cylinders of shorter lengths.

2. Description of Prior Art

There are various industries which require large volumes of short lengths of glass tubes and rods having cylindrical external surfaces. For example, vast numbers of automobile fuses are manufactured employing short-length glass tubes. Other examples include glass cases for diodes, capacitors and reed switches.

Until the advent of the present apparatus and method, the ways of separating long lengths of extruded glass tubing (and rods) into desired short lengths were unsatisfactory for various reasons. Two of such prior-art ways will now be discussed briefly.

To achieve precision separation of glass tubes into desired lengths, so that there are no substantial chipped ends, etc., it is now conventional to "pot" somewhat longer lengths of tubes in synthetic resin or wax. For example, a tube length approximately four or five inches long is filled with and surrounded by the synthetic resin, and the latter is allowed to harden. Then, with the internal and external support provided by the resin, there is no substantial chipping and breakage when diamond wheels are employed to make the desired separations. After subdividing of the tubes is completed, the synthetic resin is removed by heating and then by an extensive cleaning process.

The described potting and separation operations are productive of precision-cut glass tubes but are extremely laborious, slow, expensive, etc. As a further disadvantage, the potting substance tends to accelerate wearing-out of the expensive diamond wheels, since such wheels must grind through the potting material as well as the glass.

A second way of separating glass tubes into short lengths, and one which does not require potting, makes use of the thermal shock principle. A machine of this type uses a multiplicity of rotating chucks each of which contains a length of glass tubing. The tubes move past burner wheels so that separations result as the result of thermal shocks. At any particular time, only one separation is occurring in each tube. This type of machine is extremely large and heavy, with many moving parts, yet it cannot subdivide glass tubes with the precision, speed, cleanness, low energy requirement, etc., achieved by the present method and apparatus.

SUMMARY OF THE INVENTION

The present apparatus and method achieve precision and quality levels substantially equal to those resulting from the slow, laborious potting method described above, yet has a production rate much higher than that of the indicated thermal-shock apparatus. Furthermore, the present apparatus is compact and light, being so simple to operate that a single operator may service a number of machines. Since the diamond wheels do not have to cut through potting material, they last surprisingly long periods of time even while maintaining tremendous production volumes. There is much versatility relative to tube diameter, tube length, and other parameters.

In accordance with the method, the glass cylinders are rolled past grinding wheels in such manner that full separations are effected and, furthermore, the resulting components of the cylinders are caused to continue rolling just as if no partial separation or full separation had been effected. Thus, there is no relative movement between the components of any cylinder until after complete separation has been achieved by the grinding means. This creates the vast advantage that separation results solely from grinding, not breaking.

To effect the rolling of the cylinders, while they are closely adjacent each other for maximized production rate and other benefits, the cylinders are maintained under compression between a drive roller and a pressure sheet, the latter having at least a portion concentric with the roller. The relationships are preferably caused to be such that the separated components are discharged from the machine as soon as possible after complete separation has occurred. The drive roller is preferably caused to rotate in a direction opposite to that of the grinding wheels, for minimization of chipping. The relatively long cylinders are fed into the space between the drive roller and the pressure sheet one at a time, without crossing, by utilizing agitation means of a certain type.

In accordance with the apparatus, a hopper for the long cylinders is provided above a drive roller. The relationships are such that cylinders from the hopper move down adjacent one side of the drive roller, between it and a tensioned sheet of thin material which curves around the drive roller coaxially therewith. The sheet is under such tension that no relative movement can occur between any two components of any single cylinder, even when there is only a tiny bit of glass connecting such components. Thus, as stated, the entire separation operation is effected by grinding, not by breaking. Either the drive roller or the pressure sheet is caused to have a rubber surface layer.

Means are provided to move the hopper and associated drive wheel and pressure sheet away from the grinding wheels, for adjustment and loading purposes. Means are provided to adjust the tension of the pressure sheet. Means are also provided to effect correct one-at-a-time feeding of the long glass cylinders, without crossing relative to each other. Furthermore, means are provided to water cool the grinding wheels and to effect water washing of the chips resulting from the grinding.

BRIEF DESCRIPTION OF THE DRAWINGS

FIG. 1 is a top plan view of the apparatus for subdividing long glass cylinders into predetermined component cylinders, portions of the hopper being broken away to illustrate the parts therebeneath;

FIG. 2 is a side elevational view of the apparatus, as viewed from the right side in FIG. 3;

FIG. 3 is a transverse vertical sectional view taken on line 3—3 of FIG. 2;

FIG. 5 is an isometric view illustrating intermediate support means for the separation apparatus, and showing the slots in the pressure sheet;

FIG. 6 is a schematic view, partly in section, illustrating the sheet-tensioning mechanism and also the backup and adjustment means for the drive roller (the diamond wheels being unshown);

DETAILED DESCRIPTION OF THE PREFERRED EMBODIMENT

The word "rubber," as used in the present specification and claims, includes natural and synthetic rubbers and similar materials adapted to effect a high-friction driving contact with the exterior of a vitreous cylinder without damaging the same.

The word "vitreous" is used herein in a broad sense, to comprehend not only glass but other hard, brittle, non-metallic substances (such as, for example, ceramics) adapted to be precision separated by grinding wheels.

The word "cylinder" is used in its conventional sense, namely an object having its external surface defined by a straight line which is revolved about an axis parallel thereto and which at all times intersects a circle lying in a plane perpendicular to such axis, the circle having such axis as its center.

Figure 3A:
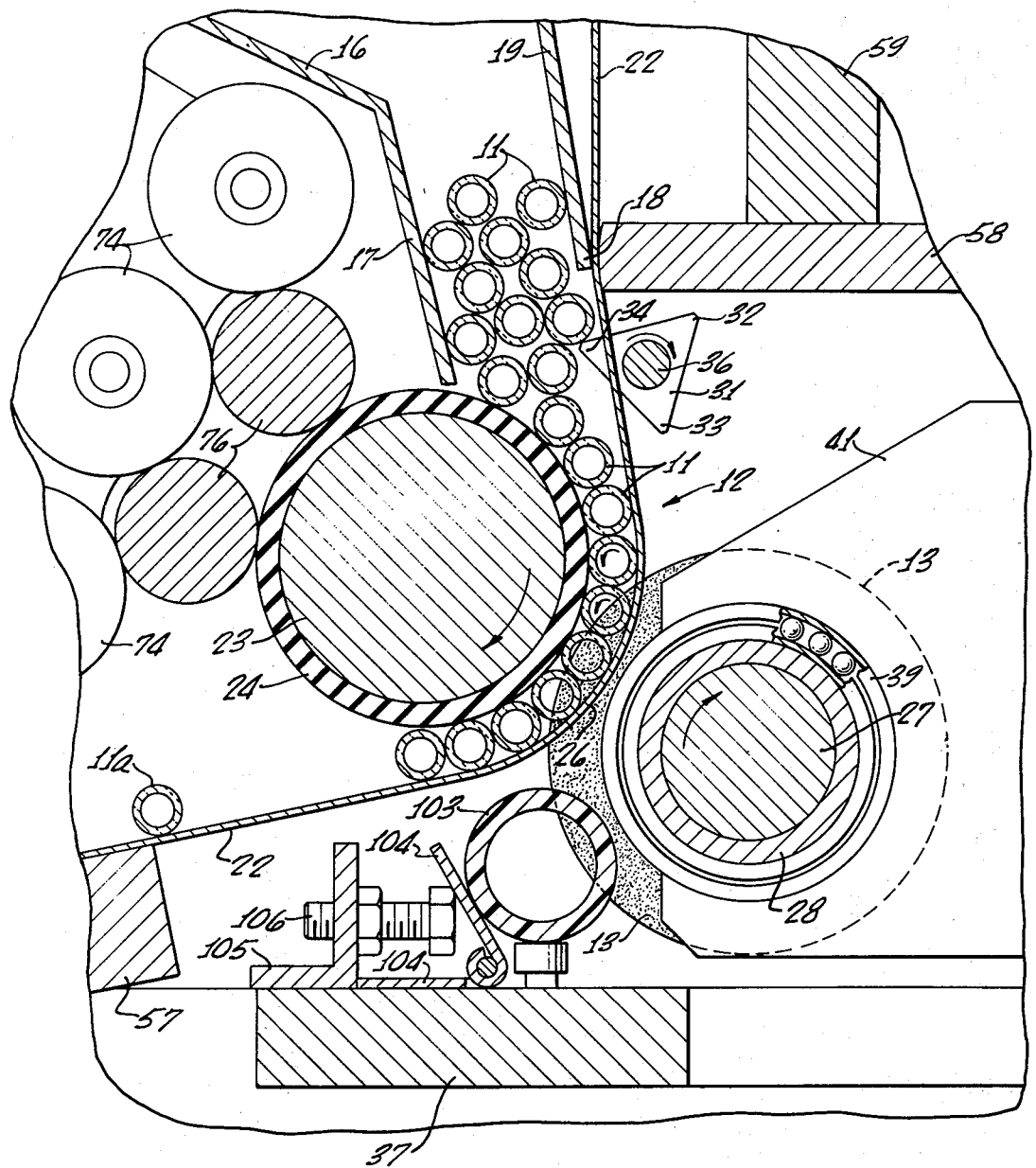
FIG. 3a is an enlarged view of the central portion of FIG. 3.

Referring first to FIGS. 3 and 3a, in particular, the apparatus comprises a supply means 10 for delivering glass (or other vitreous) cylinders 11 to roller and gripping means indicated generally at 12. Such means 12 roll the cylinders relative to a plurality of grinder wheels 13 so that the long cylinders are subdivided into shorter component cylinders of precise desired lengths. During the rolling, there is pressure gripping sufficiently tight that—even at the last instant prior to full separation—the various component cylinders of each long cylinder remain rolling at the same exact speed and without any motion relative to each other. The ends of the component cylinders lie in planes perpendicular to their axes.

Supply means 10 comprises a hopper adapted to receive a large number of extruded glass cylinders 11 of any desired length. For example, each cylinder 11 may be 48 inches long, it being understood that shorter lengths may be separated by providing internal partition means (not shown) at appropriate places in the hopper 10. Each cylinder 11 is, in many instances and as shown in FIG. 3a, hollow and thus tubular. A typical outer diameter of the tube (which is given by way of example only, not limitation) is about 0.22 inch.

The hopper 10 has an inclined bottom wall 16, the lower edge of which is bent downwardly to form a generally upright portion 17. Spaced away from an intermediate region of the upright portion 17 is the lower edge 18 of another hopper wall 19. Such wall 19 extends upwardly to the upper portion of the apparatus, generally opposite the inclined wall 16. Walls 16, 19 are connected to each other by end walls 21.

The space between elements 17, 18 is at least a plurality of tube diameters wide (horizontal dimension), so that a plurality of the tubes or cylinders 11 crowd downwardly therebetween by gravity as illustrated in FIGS. 3 and 3a. Provided immediately adjacent and below the edge 18 is a portion of a pressure sheet 22. Thus, the portion of pressure sheet 22 beneath edge 18 cooperates with the opposed region of wall 17 to confine the tubes therebetween prior to the time they pass through the rolling and gripping means 12. Furthermore, in this portion of the apparatus the tubes are agitated in a predetermined manner in order to prevent them from being crossed relative to each other, and in order to eliminate any crossing that may have occurred.

Proceeding next to a description of the rolling and gripping means 12, this comprises a drive roller 23 having an outer layer 24 formed of rubber. The rubber layer 24 has an exterior cylindrical surface oriented parallel to the axes of the tubes or cylinders 11. The axis of roller 23 is generally beneath the lower edge of the upright portion 17 of wall 16, so that the tubes—after they pass downwardly between elements 17, 18—engage the upper surface of layer 24 and are urged to the right (as viewed in FIGS. 3 and 3a) due to the fact that the rotational direction of roller 23 is clockwise.

In addition to the drive roller 23, including its rubber layer 24, the rolling and gripping means 12 comprises a portion of pressure sheet 22 immediately beneath the portion described above. The latter portion is indicated at 26 and is concentric with the roller 23. In the illustrated embodiment, portion 26 curves through an angle of about 90°, and this curved region is spaced from the exterior cylindrical surface of rubber 24 by a distance substantially equal to the outer diameter of each tube or cylinder 11. Thus, a partial annulus is defined between portion 26 and the opposed region of the rubber. While in such annulus, the axes of the tubes or cylinders 11 lie along an imaginary cylinder coaxial with the roller.

Preferably, pressure sheet 22 is formed of a thin sheet of stainless steel or other suitable metal, although plastics (for example, Mylar) may also be employed. The stainless steel sheet is, preferably, very thin, being (for example) only 0.01 inch in thickness.

Sheet 22 is maintained under sufficient tension, in directions transverse to tubes 11, to cause such tubes to bite into rubber layer 24 and provide a positive frictional gripping force therebetween. Such force insures that there will be only rolling motion, no sliding motion. As an illustration, the rubber layer 24 is 0.1 inch thick and has a hardness of 60 Durometer. The tension (in the present illustration) applied to sheet 22 is 15 pounds per lineal inch of a single tube 11. With such a tension, in the exemplary machine in which the tubes 11 are 48 inches long, the total tension applied to pressure sheet 22 is approximately 720 pounds. This large force may be withstood by the glass tubes because the force is distributed over a wide area.

The roller 23 is driven clockwise at a rate compatible with the rate of driving of the grinding wheels 13, which latter rate is adapted to achieve a high production volume without excessive vibration. An exemplary rate of driving of the grinder wheels is 3200 rpm. For example, the rate of driving of roller 23 may be such as to cause a row of separated cylinders to discharge from the apparatus once every two and one-half seconds. As an illustration, when the product being manufactured is the 0.22 inch diameter glass sleeve or casing for a fuse, and such sleeve is about 1.22 inches long, the number of separated sleeves discharged from the 48 inch exemplary apparatus every 2½ seconds is about 39. Thus, a typical production rate is over 14 sleeves per second (50,000 per hour) for such a sleeve length. This may be increased to at least 70,000 per hour.

The grinding wheels 13 are formed of diamond dust contained in a suitable matrix (for example, metal). Such wheels are commercially available, being manufactured, for example, by Norton Company of Worcester, Mass. The wheels 13 are mounted on a shaft 27 and are separated precision distances from each other by spacer sleeves 28. Suitable shims, not shown, may be provided to adjust the degree of spacing of the wheels with great precision.

The peripheral regions of wheels 13 extend through slots 30 (FIG. 5) in pressure sheet 22. Such slots are preferably precut where the sheet 22 is formed of stainless steel, as is preferred, but it is to be understood that the slots may be cut by the diamond wheels themselves—particularly when the pressure sheet is formed of a substance such as Mylar.

It is emphasized that the element 22 is termed a "pressure sheet" because of the lateral (radial) pressure it exerts against the tubes 11 when in the partial annulus in the rolling and gripping means 12. In other words, the pressure referred to is that exerted generally radially-inwardly relative to the drive roller 23. There is no implication that there is lateral (radial) pressure exerted by sheet 22 relative to the tubes while they are in the region between elements 17 and 18.

As above indicated, the tubes 11 are "agitated" while they are immediately above the rolling and gripping means 12. Such agitation is not effected in any random manner but instead by certain synchronized agitator elements 31. Referring particularly to FIG. 3a, the agitator elements 31 are generally triangular in shape and are disposed adjacent sheet 22 generally beneath edge 18. The relationship is such that when the elements 31 are rotated clockwise about their axes, the various corners 32-34 thereof will sequentially engage and lift or shift the adjacent tubes 11—there being slots (FIG. 6) in sheet 22 through which such corners protrude.

In the exemplary apparatus wherein the tubes are 48 inches long, there are (for example) five elements 31 spaced substantially equal distances along a common shaft 36 which is parallel to the tubes. Each element 31 may be approximately one-quarter inch in its dimension longitudinal of its shaft. The elements 31 are all at the same angular position on their shaft. Shaft 36 is rotated clockwise as viewed in FIGS. 3 and 3a to create the stated generally upward "massaging" action as each corner 32-34 successively pushes in the adjacent tube or tubes.

The agitator action has been found to prevent or eliminate any crossing of tubes 11 which may occur, so that the tubes are not crushed when they enter the gripping and rolling means 12.

The speed of rotation of shaft 36 is correlated to that of drive roller 23. In the specific example, wherein the roller 23 is driven at such a speed as to discharge a row of separated cylinders once each 2½ seconds, the shaft 36 is preferably driven at approximately 70 rpm.

ADDITIONAL APPARATUS, AND INCLUDING MEANS FOR PERMITTING STARTING AND FOR ACHIEVING VARIOUS ADJUSTMENTS

The fixed supports for the apparatus include a horizontal base plate 37 which is mounted fixedly above the floor by suitable leg means, not shown. Provided at the ends of the base plate are bearings 38 (FIG. 7) for shaft 27 of the grinder wheels. Furthermore, and particularly in a relatively long apparatus such as one 48 inches in length, shaft 27 has intermediate bearings at spaced points therealong as shown at 39 in FIGS. 3a and 5.

Bearings 39 are preferably ball bearings the inner races of which are disposed around spaced sleeves 28 on shaft 27. The outer races of the ball bearings are mounted in vertical support plates 41 (FIGS. 3a and 5) which are adjustably mounted on base plate 37. The support plates 41 only enclose part of the outer races of the ball bearings, as shown in FIG. 3a, in order to prevent contact with pressure sheet 22.

In order that support plates 41 and thus bearings 39 may be properly adjusted, the support plates 41 are provided with vertical slots through which extend studs 42 mounted on back-up plates 43. When nuts 44 on studs 42 are tightened, clamp bars 46 are clamped against the associated support plates 41 to bring them into tight frictional engagement with back-up plates 43. Clamping is thus achieved after plates 41 have been adjusted upwardly or downwardly as desired.

The back-up plates 43 are, in turn, mounted on base plate 37 for horizontal adjustment in any direction. Thus, each back-up plate is secured to a horizontal plate 47 which is adjustably clamped to base plate 37. For this purpose, bolts 48 extend downwardly through a clamp bar 49 and also through oversize openings in plate 47. Then, when nuts (not shown) are tightened on bolts 48, each clamp bar 49 presses the underlying plate 47 tightly against base plate 37 at the desired adjusted position.

The described adjustments permit precise locations of the bearings, for example in order that they will be between slots 30 (FIG. 5) of pressure sheets 22 for different glass tube lengths.

The shaft 27 is driven at a relatively high speed by motor means 52 schematically represented in FIGS. 1 and 2. Such motor means, which may include suitable gearing, typically drives the grinder wheels 13 at a rotational speed of about 3200 rpm, as previously stated.

Provided on opposite ends of base plate 37 are downwardly-extending blocks 53. Such blocks 53 are pivotally connected, by pivot shaft means 55, to ears 54 which form portions of vertical end plates 56. The end plates lie in parallel planes which are perpendicular to the axes of the glass tubes 11 and of roller 23.

A bar 57 is bolted fixedly between the end plates 56, being slightly inclined as shown in FIGS. 3 and 3a, and serving as a support for the lower portion of pressure sheet 22. Such sheet 22 is inclined at this region, below the rolling and gripping means 12, so that the short cylinder components may roll down for discharge from the apparatus.

A second bar, numbered 58, is bolted in horizontal relationship between end plates 56. Bar 58 is so located that its left edge (as viewed in FIGS. 3 and 3a), is closely adjacent the bottom edge 18 of hopper wall 19, being separated from such lower edge 18 by a region of pressure sheet 22 as illustrated. Thus, the tensioned pressure sheet 22 is located precisely by being slightly bent around the bar edge.

A third bar 59 is bolted in vertical relationship to the upper side of bar 58. In turn, bar 59 has bolted thereto two parallel plates 61 (FIGS. 1–3) in which is journaled a short horizontal shaft 62. There is threaded through a transverse bore in shaft 62 an elongated, externally-threaded pivot rod 63. The lower end of such rod is suitably journaled between bearing plates 64 which are pivotally mounted to a bar 65 bolted to the underside of base plate 37.

Figure 7:
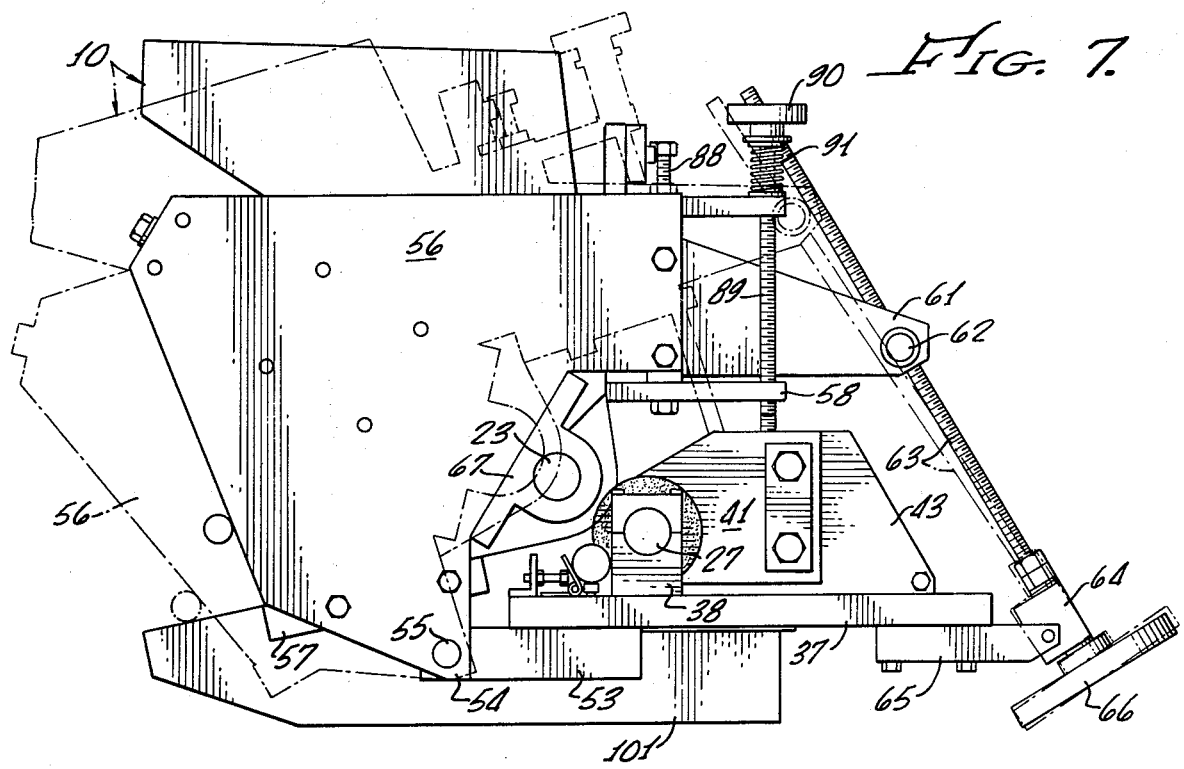
FIG. 7 is a side elevational view of the apparatus, illustrating the hopper and end plates in various pivoted positions.
Figure 4:
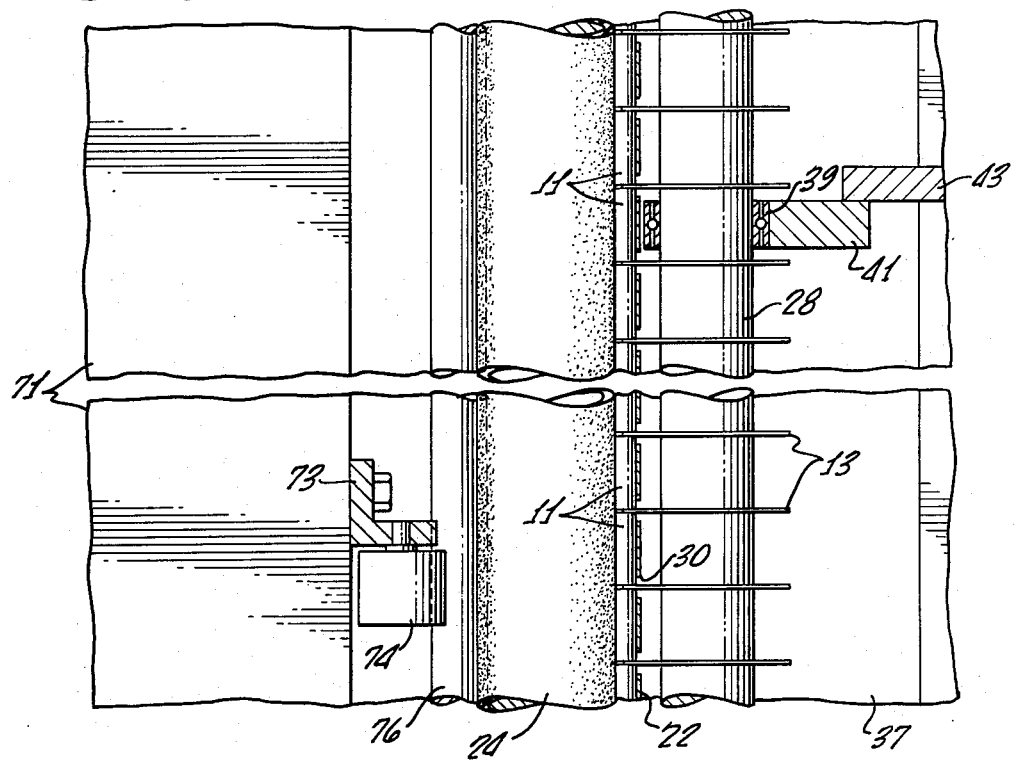
FIG. 4 is a sectional view on line 4—4 of FIG. 3.

When a wheel 66 on rod 63 is turned, the threaded relationship between such rod 63 and shaft 62 causes the end plates 56 to pivot about the pivot means 55 at ears 54, thus moving such end plates and associated structure to various positions such as the ones illustrated in FIG. 7. Such pivotal movement is effected during the start of a production run, as described below.

Referring to FIGS. 1, 2, and 6, stop rods 69 are suitably threadedly associated with a lug on bar 59, and extend downwardly for engagement with stop blocks 70 on base plate 37. These rods are so set, for each tube diameter and wall thickness, to permit achievement of the optimum separation of the tubes or cylinders into predetermined components. In other words, the stop rods create the exact desired amount of penetration of the peripheral regions of the grinder wheels into the space between pressure sheet 22 and rubber 24.

The above-described drive roller 23 is journaled, at its ends, in bearings 67 (FIG. 7), which bearings are secured to end plates 56. A motor and suitable gearing, schematically represented at 68 in FIGS. 1 and 2, are suitably connected to one of the end plates in order to drive the roller 23.

Particularly in relatively long machines, such as the exemplary one wherein the tubes 11 and 48 inches long, it is desirable to provide back-ups for drive roller 23 in order to insure that it will be substantially perfectly straight throughout its entire length. In this connection, it is pointed out that the tensioned sheet 22 may sometimes tend to bow the drive roller. For this purpose, a bar 71 is caused to extend between end plates 56 for adjustment in a plane generally radial to drive roller 23. More particularly, the ends of bar 71 are mounted slidably between two sets of angle bars 72 which are bolted to end plates 56, as shown in FIGS. 3 and 6.

Angle bars 73 are mounted at the inner (lower) edge of bar 71, each such bar 73 rotatably supporting three rollers 74 which rotate freely about horizontal axes. The rollers 74 engage the outer portions of elongated cylinders 76 which, in turn, engage the peripheral surface of the rubber outer layer 24 of the drive roller. Deflection of the drive roller, in response to the pressure exerted by the pressure sheet 22, is thus effectively prevented.

To adjust the bar 71, and thus the associated rollers and cylinders, blocks 77 (FIGS. 1, 3, and 6) are mounted on end plates 56 and have bolts 78 extended therethrough into elongated internally-threaded bores in the upper edge of bar 71.

Proceeding next to a description of the means for mounting and tensioning the pressure sheet 22, and for adjusting the degree of pressure-sheet tension, this comprises a rockable angle bar 82 and associated rocking mechanism. The upper and lower ends of sheet 22 are bent, respectively, around the flange of bar 82 and around the lower (left) end of bar 57, being clamped in position by clamp bars 83–84 and screws 86–87.

Fulcrum screws 88, having conical lower ends, are threaded downwardly through the horizontal web of rock bar 82 and extend into sockets in the upper edge of bar 59. Thus, bar 82 may pivot as a first-class lever, adjusting the degree of tension in pressure sheet 22, in response to turning of vertical threaded shafts 89 having handwheels 90 at their upper ends. Shafts 89 extend freely through bar 82 (not being in threaded relationship thereto) and are threaded through bars 58. Helical compression springs 91 are seated between bars 82 and the undersides of handwheels 90 to thus provide resilient downward pressure the magnitude of which is determined by the handwheel setting.

It will be understood that the drive roller 23 and its motor bearings, and the pressure sheet 22 and its adjustment means, are all mounted to end plates 56 and thus pivot (in response to turning of handwheel 66) to various positions such as those shown in FIG. 7. The supply means 10, in the present embodiment a supply hopper, is also mounted (by suitable means, now shown) to the end plates 56 and is thus also pivotally adjustable with the associated drive roller 23 and pressure sheet. Furthermore, the bearings and the motor 93 (FIGS. 1 and 2) for the agitator shaft 36 are mounted to the end plates.

As described in detail subsequently under the "Method" subheading, the handwheel 66 is turned in order to effect upward pivoting of the end plates 56 and all associated structure, until the grinding wheels 13 no longer penetrate their associated slots 30 (FIG. 5) in sheet 22. Glass tubes 11 of the desired size for a particular production run are then introduced into the means 12 as described subsequently, following which the handwheels 90 are turned to achieve the desired degree of tension in pressure sheet 22. Thereafter, handwheel 66 is turned to cause the end plates 56 and associated structure to pivot downwardly (as described below) to the particular position desired for the size (diameter) of the tubes or cylinders 11. Such position is maintained by the stop means 69, 70.

COOLING, CLEANING, AND FEEDING MEANS EMPLOYING WATER OR OTHER SUITABLE LIQUID

As shown in FIGS. 1 and 3, a horizontal water tube 96 is provided with nozzles 97 which spray water jets 98 toward the lower-left quadrant of drive roller 23 as viewed in FIG. 3. Such jets wash the dust, resulting from the grinding operation, downwardly along the portion of pressure sheet 22 which rests on bar 57. Furthermore, the water enhances the discharging of the separated cylinder components 11a from the apparatus.

After the cylinder components 11a thus roll down pressure sheet 22, such components and the associated water pass downwardly to a screen region 99. The components 11a continue to roll along the screen to a discharge bin (not shown), but the water and contained glass dust pass through screen 99 into a sump 101 which is suitably supported on base plate 37. The sump may be formed of sheet metal, and incorporates suitable drain means such as are indicated at 102. If desired, the water and glass dust may be treated to separate the dust from the water, and the water reused.

Preferably, the hopper 10 and contained tubes or cylinders 11 are perfectly dry. It is possible, however, to cause the tubes 11 in hopper 14 to be immersed in a pool of water. In other words, the hopper is filled with water to a position above at least the lower ones of the tubes in the hopper. If the hopper is thus filled or partially filled with water, suitable water jet means (not shown) are provided to continuously introduce water into the hopper.

The diamond wheels 13 are water cooled in a very simple and effective manner which facilitates different settings of such wheels for different production runs (different lengths of component cylinders or tubes 11a). For this purpose, an elongated plastic tube 103 (FIG. 3a) is suitably secured to the upper leaf of a piano hinge 104, the lower leaf of such hinge 104 being secured to base plate 37. An angle bar 105 is mounted adjacent the hinge 104, and has threaded therethrough a plurality of horizontal bolts 106.

When the bolts are turned in such direction as to effect upper-right pivoting of the upper leaf of hinge 104, during a period when the shaft 27 for wheels 13 is being driven, the wheels grind slots in tube 103. Such pivoting is caused to be sufficient that the slots will completely penetrate the tube wall so that water emanates from the tube and cools the diamond wheels.

When the machine is to be adapted for a different production run, with different lengths of separated glass tubes, the original tube 103 is removed and discarded, following which another tube is secured to the piano hinge 104 and the above-described operation repeated.

DESCRIPTION OF THE METHOD

The method may be performed relative to vitreous cylindrical tubes or solid vitreous cylinders of any desired initial length, so as to divide the same into substantially any desired shorter lengths. An illustration has been stated above wherein a glass tube 48 inches long is subdivided into tubes approximately 1.22 inch long. As another illustration, a solid glass cylinder about 20 inches long may be subdivided into large numbers of glass discs each approximately twenty thousandths of an inch "long." The variations in length are thus substantially infinite, and the method is also readily performed relative to numerous different diameters.

Relative to length tolerance, a high-speed production machine will hold a tolerance of plus or minus one thousandth of an inch for a period of at least several days, following which compensations should be made for the slight wear which occurs relative to the lateral faces of the diamond discs. It is emphasized, however, that (particularly since no potting material need be employed) the wear on the diamond discs is very small. One apparatus produced one million glass tubes each 1.220 long and created an amount of wear on each diamond disc such that the radius of the disc was decreased five thousandths of an inch and the thickness decreased by only one-half a thousandth. The radius change is readily compensated for by adjustment of the wheel 66 (FIG. 3) and associated stops, whereas the thickness change is compensated for by use of shims.

Where such close tolerances are not needed, the method will hold a tolerance of plus or minus three thousandths of an inch for an extremely long period of time.

In preparing to perform the method relative to parts (for example, glass tubes) of a particular length and diameter, the handwheel 66 is first turned in order to lift the pressure sheet 22 completely away from diamond wheels 13, the apparatus then pivoting counterclockwise about pivot means 55 as viewed in FIGS. 3 and 3a. Then, spacers 28 (FIG. 5) are provided of proper length to cause the wheels 13 to be the precise desired distances from each other for the particular part length desired. A water tube 103 (formed, for example, of polyvinylchloride) is then mounted to the upper leaf or piano hinge 104, for subsequent movement into the grinding wheels as described above.

A pressure sheet 22 is mounted in the machine by use of clamp elements 83 and 84. If the production run is to be a relatively short one, the pressure sheet 22 may be formed of Mylar so that the grinding wheels will cut their own slots in the Mylar. For long production runs, and as stated above, the pressure sheet 22 is preferably formed of stainless steel and slots 30 (FIG. 5) are precut therein for the grinding wheels. Such slots are preferably somewhat wider than are the wheels, so that any chips that may occur will discharge readily from the apparatus.

While the pressure sheet 22 is still relatively loose, single tubes 11 are pressed, sequentially, down between the roller 23 and pressure sheet portion 26 which make up rolling and gripping means 12. The amount of tension applied to the sheet 22, at this time, is caused to be such as to frictionally grip the various tubes between elements 24 and 26, but without strong gripping pressure. The sequential down-pushing of individual tubes is continued until the entire annulus portion has tubes therein (the tubes being in line contact with each other).

Thereafter, wheels 90 are turned to pivot rock bar 82 clockwise (as viewed in FIG. 3), increasing the tension on sheet 22 to a desired relatively high value such that the tubes adjacent sheet portion 26 are very firmly frictionally gripped and squeezed by the rubber 24. The sides of the tubes then "sink" somewhat into the rubber layer.

Then, driving of the diamond wheels 13 is commenced, water tube 103 is pushed against the diamond wheels by bolts 106, as described above (in order to effect initiation of water cooling of the diamond wheels), and handwheel 66 is rotated in such direction as to cause clockwise pivotal movement of roller 23 and pressure sheet 22 as viewed in FIG. 3. Such clockwise movement is caused to be relatively slow, so that it takes (for example) about one minute before the desired relative positions of the roller 23 and diamond wheel are achieved. This movement occurs prior to starting of driving of the roller 23.

As soon as the roller 23 is in the correct relationship to grinding wheels 13, for the particular part size, hopper 14 is filled with tubes and driving of the roller 23 is started. The tubes then feed downwardly by rolling action as above described relative to FIGS. 3 and 3a, and are separated into component tubes 11a which are discharged from the apparatus as described. At the beginning of a production run, the first several tubes are not used since they are not completely or properly separated.

The exact distance between the peripheral edge of each cutting wheel 13 and the peripheral surface of rubber layer 24 is determined in accordance with the following considerations: (a) Each tube must be fully separated, and (b) each tube should cease to be engaged by the grinder wheels just as soon as it is fully separated. It has been found that excessive grinding decreases the cleanness and accuracy of the cut, thus rapid discharge (after completion of separation) is greatly desired.

The peripheral edge of each wheel 13 is caused to at least penetrate through the wall thickness of the particular tube. Then, as the tubes roll along as shown in FIG. 3a, there is a progressive grinding action relative to the entire circumference of the tube. In the above-indicated preferred relationship whereby the tubes roll counterclockwise and the diamond wheels 13 roll clockwise (or in the converse relationship where the direction of rotation of each of these elements is reversed) the periphery of the grinding wheel is so directed as to throw dust into the center of each tube. This has been found to produce the optimum separation.

It is emphasized that, because the tubes roll while being ground, grinding only occurs at one tube edge— not both.

Because each tube is so firmly gripped in the means 12, it may be stated that the individual components of each tube "do not know" when full separation has occurred. They continue to rotate at exactly the same speed, and in exactly the same positions relative to each other, as if there had been no separation. This is important in that it means that even a tiny sliver of glass which extends between two adjacent tube sections immediately prior to full separation is not broken but is instead ground off by the diamond wheel. There are, therefore, no pointed spots, sharp regions, etc., the end of each tube being relatively smooth.

The glass dust resulting from the present grinding is approximately one-half thousandth of an inch in diameter, which means that (as stated above) the end faces are substantially smooth. At the present, and with the detailed apparatus, there is a reject rate of about one percent but it is believed that this may be improved.

The method may be performed with a relatively small, light, compact apparatus, and a single operator may serve a substantial number of machines. Thus, the floor space and labor costs required for performance of the method are minimal. A single machine, adapted to handle 48 inch glass tubes, weighs only about six hundred pounds. It has such a small power requirement that a standard 110 volt wall socket may be used.

When the production run is desired relative to a different length and/or diameter of vitreous tubes or solid cylinders, the above-described method is merely repeated but with somewhat different adjustments. There being no fumes resulting from the process, no venting is required. The operator need not wear any special safety gear.

EMBODIMENT OF FIG. 8

Figure 8:
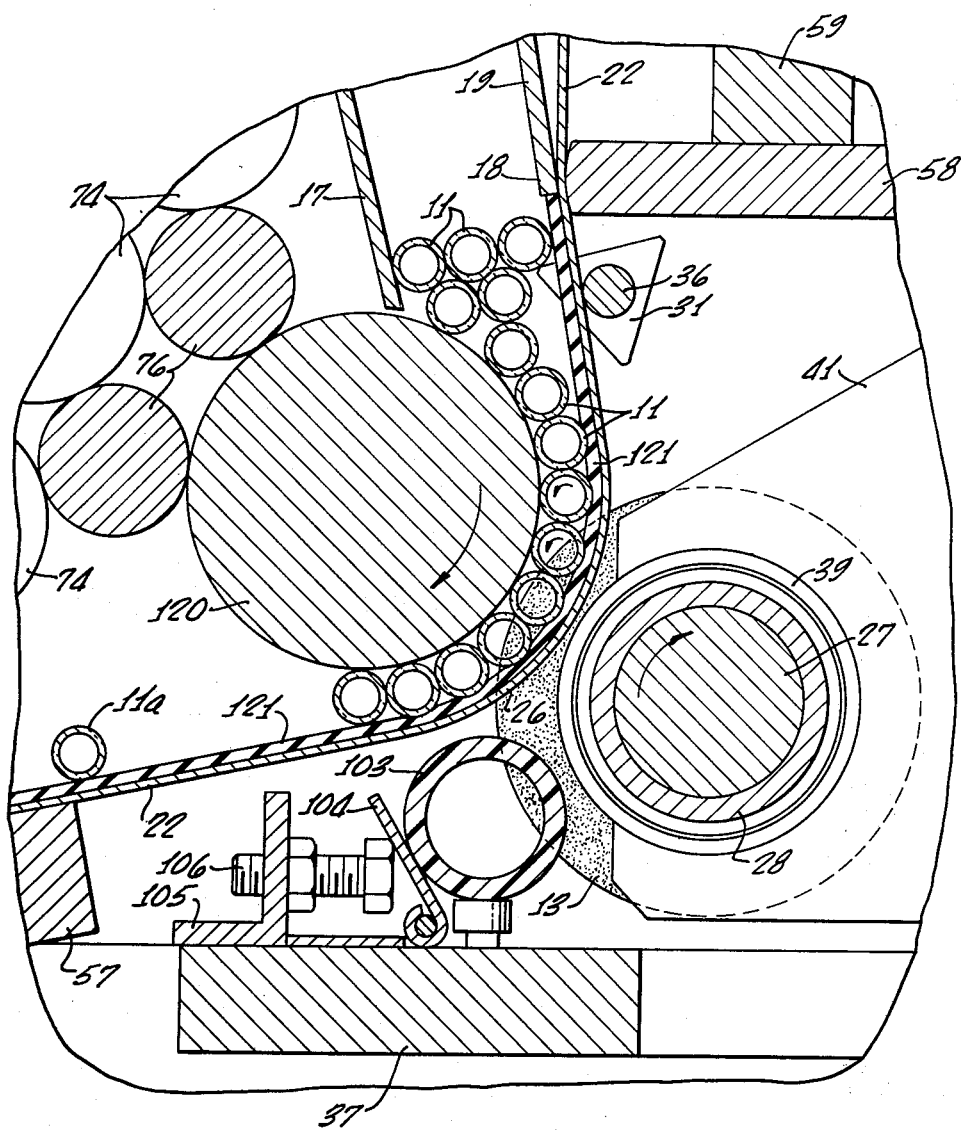
FIG. 8 is a sectional view of a second embodiment.

The embodiment of FIG. 8 is identical to that of FIGS. 1-7, except as specifically stated below. The showing of FIG. 8 is on the same scale, and taken at the same location, as that of FIG. 3a.

At the time of execution of the patent application, the embodiment of FIG. 8 is the best mode contemplated by the inventor.

In the showing of FIG. 8, the rubber layer 24 (FIG. 3a) on cylinder 23 is omitted entirely. The roller is then (preferably) caused to have a larger diameter, and is numbered 120 in FIG. 8.

It is pointed out that there may be a thin coating of rubber or other friction-enhancing material on roller 120, to aid in prevention of slippage relative to the glass tubes. Such a coating would only be a few thousandths of an inch thick, and therefore would not permit the tubes to "sink" into the coating to any substantial extent.

A relatively thick layer 121 of rubber is mounted on the interior surface of pressure sheet 22, so as to engage the tubes 11. Thus, in both FIGS. 8 and 3a, the tubes (cylinders) are gripped and rolled between a relatively hard surface and a relatively soft surface. Such soft surface is preferably rubber, and the combination of the softness and the radial pressure causes the tubes to "sink" somewhat into the soft surface as they roll. This partial "sinking" is shown more distinctly in FIG. 8 than in FIG. 3a, but is to be understood as occurring in both figures (both embodiments).

The reasons contemplated by the inventor for preferring the embodiment of FIG. 8 are as follows:

1. As the tubes are subdivided they would not tend to sink deeper into a soft roller surface layer due to the reduction in surface area. It is pointed out that the total surface area of each tube is reduced, during subdividing, because of the glass ground away by the diamond wheels.
2. When very small "toothpick" diameter tubes are cut, the tubes cannot be presed into the roller surface beyond the reach of the diamond wheels. Increased holding tension, applied to the ends of sheet 22, would be possible.
3. The rubber liner 121 is very easy and inexpensive to replace, as may be necessary when an excessive number of glass chips become embedded therein.

Relative to all embodiments, the wheels 13 which effect subdividing need not be "diamond" wheels but may incorporate other very hard materials.

The foregoing detailed description is to be clearly understood as given by way of illustration and example only, the spirit and scope of this invention being limited solely by the appended claims.

I claim:

1. A method of subdividing vitreous cylinders into cylinders of shorter lengths, which method comprises:
   (a) providing a plurality of means, adapted to subdivide vitreous substances, in spaced parallel planes and in general alignment relative to each other,
   (b) providing an elongated vitreous cylinder the axis of which is perpendicular to said planes,
   (c) effecting conjoint lateral and rotational movement of said cylinder to bring said cylinder into engagement with said means,
   said conjoint lateral and rotational movement being effected by rolling said cylinder between opposed surfaces,
   (d) continuing said conjoint lateral and rotational movement of said cylinder to cause it to be simultaneously and fully subdivided by said means into at least several shorter cylinders the ends of which are perpendicular to the common axis thereof, and
   (e) preventing each of said rotating and laterally-moving shorter cylinders from moving relative to any other of said rotating and laterally-moving shorter cylinders until said subdivision by said means, as recited in step (d), is fully completed,
   whereby said subdivision is effected solely by said means so as to prevent the formation of slivers and sharp points at any parts of the ends of said shorter cylinders.

2. The invention as claimed in claim 1, in which said method further comprises causing one of said opposed surfaces to be relatively hard, and causing the other of said opposed surfaces to be relatively soft rubber, and in which said cylinders are glass tubes.

3. The invention as claimed in claim 1, in which said cylinders are glass.

4. The invention as claimed in claim 1, in which said cylinders are glass tubes.

5. A high-production method of separating a multiplicity of identical elongated vitreous cylinders into cylinders of precisely predetermined shorter lengths, which method comprises:
   (a) rolling a multiplicity of identical, elongated vitreous cylinders sequentially along a support, in parallel relationship to each other,
   (b) employing at least several laterally-spaced power-operated grinder elements to effect separation of said cylinders, while they thus roll along said support, into shorter component cylinders the lengths of which are determined by the lateral spacing between said grinder elements, and
   (c) causing said component cylinders of each elongated cylinder to roll, as said separation step (b) progresses and at least until said separation step is fully completed, in the same positions relative to each other as they would have been in had said separation step not been performed,
   whereby said separation is effected entirely by grinding and not breaking.

6. The invention as claimed in claim 5, in which said method further comprises causing said cylinders, while they are thus rolled, to be in line contact with each other.

7. The invention as claimed in claim 5, in which said method is performed on glass cylinders using power-driven diamond wheels as said grinder elements.

8. The invention as claimed in claim 7, in which said method further comprises causing the direction of rotation of said diamond wheels to be opposite to the direction of rolling-rotation of said cylinders.

9. The invention as claimed in claim 7, in which said method is performed on glass tubes.

10. The invention as claimed in claim 9, in which said method further comprises causing the direction of rotation of said diamond wheels to be opposite to the direction of rolling-rotation of said glass tubes.

11. A method of mass-producing subdivided vitreous cylinders, comprising:
   (a) frictionally gripping the exterior surface of an elongated vitreous cylinder between opposed parallel elements,
      said gripping being effected with force sufficiently great to prevent sliding or slipping of said cylinder, but insufficiently great to crush or damage said cylinder,
   (b) effecting relative movement of said elements parallel to each other and in such manner as to effect rolling of said cylinder,
      said relative movement of said elements causing said cylinder to roll in a predetermined direction,
   (c) providing at least several separating means in the path of said rolling cylinder, spaced along the axis of said cylinder, and adapted to subdivide said cylinder into a plurality of separated component cylinders, and
   (d) causing said rolling to continue until said separating means effect full subdividing of said cylinders.

12. Th invention as claimed in claim 11, in which said method further comprises performing said method sequentially relative to a large number of identical parallel cylinders which are in line contact with each other during said rolling, whereby to achieve a very high rate of production.

13. The invention as claimed in claim 11, in which said method is performed using power-driven diamond wheels as said separating means.

14. The invention as claimed in claim 11, in which said parallel elements have opposed cylindrical surface portions, in which said separations are performed while said cylinder is rolling between said cylindrical surface portions, and in which said cylinders are tubes which do not have any mandrels therein.

15. A high-production method of subdividing elongated vitreous cylinders into relatively short component cylinders each having a substantially smooth end lying in a plane perpendicular to the cylinder axis, which method comprises:
   (a) providing a drive roller having an exterior cylindrical surface, and having a diameter much larger than that of the elongated cylinders to be subdivided,
   (b) providing a curved pressure means around a section of said exterior cylindrical surface, in outwardly-spaced parallel relationship relative to such section, thereby forming a curved space between said exterior surface and said pressure means,
   (c) disposing a plurality of elongated vitreous cylinders in said space, with their axes disposed in part of an imaginary cylinder which is concentric with said drive roller,
   (d) causing said pressure means and said roller to create pressure on those cylinders in said space, to thus create strong frictional gripping of said cylinders between said exterior cylindrical surface and said pressure means,
   (e) driving said drive roller to positively frictionally roll said cylinders through said space,
   (f) effecting separation of said cylinders at predetermined spaced points along said cylinders while said cylinders are in said space, and
   (g) supplying additional cylinders to said space for feeding therethrough and separating therein.

16. The invention as claimed in claim 15, in which said pressure means is flexible, and in which said step (d) is performed by applying tension to the ends of said pressure means.

17. The invention as claimed in claim 16, in which said cylinders are glass tubes, and in which said tension is caused to be many pounds for each inch of the length of a single one of said tubes.

18. The invention as claimed in claim 17, in which said separation step (f) is performed by grinder wheels spaced longitudinally of the tubes in said space, and having peripheral portions disposed in said space to grind through said tubes while said tubes are thus rolled in said space.

19. The invention as claimed in claim 15, in which said separations are effected while said tubes continue to roll, there being no interruption of rolling.

20. The invention as claimed in claim 15, in which said separation step (f) is performed by at least several grinder wheels disposed in spaced parallel planes which are perpendicular to the axes of those cylinders in said space.

21. The invention as claimed in claim 20, in which said method further comprises causing the axis of said wheels to be stationary, and initiating a production run by moving said drive roller and pressure means until the peripheral regions of said wheels are in said space.

22. The invention as claimed in claim 20, in which said method further comprises providing as said pressure means at least one sheet which is highly tensioned to bend it around said cylinders in said space and thus apply said pressure, and in which said method further comprises extending said wheels through slots or gaps in said sheet.

23. The invention as claimed in claim 22, in which said method further comprises causing one of said drive roller (a) and said pressure sheet to have a relatively soft rubber layer in engagement with said cylinders.

24. The invention as claimed in claim 23, in which said soft rubber layer is on said pressure sheet, the surface of said drive roller being relatively hard, and in which said cylinders are glass tubes.

25. Apparatus for subdividing elongated cylinders into cylinders of shorter lengths, comprising:
   (a) separation means for engaging sequentially a plurality of elongated cylinders and separating each of said cylinders into at least several component cylinders of shorter lengths,
      said separation means including at least several separation elements spaced longitudinally of said cylinders, and (b) means for rolling elongated cylinders sequentially along a support, said rolling means comprising means for rolling at least several parallel cylinders along said support in line contact with each other, said rolling means preventing any relative movement between the component cylinders of each longer cylinder, immediately prior to and during the final stages of the separation operation, whereby the separation is effected entirely by said separation elements and not by breaking, the positional relationships being such that said separation means (a) and said rolling means (b) cooperate with each other to effect full separation of said cylinders into shorter cylinders, said rolling means not including any mandrels.

26. The invention as claimed in claim 25, in which said rolling means comprises means parallel to said support to engage the sides of said cylinders opposite said support, and to effect frictional gripping of said cylinders between said support and said last-named means, the frictional gripping being sufficiently tight that relative movement between said parallel support and said last-named means, in a direction lateral to said cylinders and parallel to said support and said last-named means, will effect rolling of said cylinders without any slipping and sliding, and in which means are provided to effect said relative movement.

27. The invention as claimed in claim 26, in which said last-named means and said rolling means grip simultaneously at least several cylinders in substantially co-planar relationship and in line contact with each other.

28. The invention as claimed in claim 25, in which said rolling means operates continuously.

29. The invention as claimed in claim 28, in which said separation elements are power-driven diamond wheels.

30. The invention as claimed in claim 25, in which said separation elements are power-driven grinding wheels.

31. The invention as claimed in claim 26, in which at least one of said support and said parallel rolling means has a relatively soft rubber surface layer.

32. Apparatus for separating elongated vitreous cylinders into separate component cylinders of predetermined shorter lengths, comprising:

(a) a plurality of grinding wheels mounted in laterally-spaced relationship relative to each other, (b) motor means to drive said wheels, (c) drive surface means adapted to support a plurality of elongated cylinders, (d) pressure means to engage the opposite sides of said plurality of cylinders, said drive surface means and said pressure means cooperating to squeeze said cylinders therebetween, (e) means to move said drive surface means to effect controlled, slip-free rolling of said cylinders between said drive surface means and said pressure means, said means (c) and (d) comprising means for effecting controlled rolling of several of said cylinders in parallel relationship and in line contact with each other, and (f) means to effect relative shifting of said wheels and said means (c) and (d) in order to bring the peripheral regions of said wheels into positions to separate said cylinders into shorter component cylinders while said cylinders are thus squeezed between said drive surface means and said pressure means, said means (c) and (d) being sufficiently large that said controlled rolling continues uninterruptedly at least until full completion of separation, whereby to prevent any movement of any component cylinder of any elongated cylinder, relative to any other component cylinder of such elongated cylinder, until full separation by said wheels has been achieved.

33. The invention as claimed in claim 32, in which at least one of said drive surface means and said pressure means is formed with a relatively soft rubber surface layer.

34. The invention as claimed in claim 32, in which said means (e) operates continuously.

35. The invention as claimed in claim 32, in which said pressure means is at least one sheet, and in which said wheels extend through slots or gaps in said sheet after said means (f) operates to bring said peripheral regions into separating relationship to said cylinders.

36. Apparatus for separating cylinders, both solid and hollow, into shorter component cylinders, comprising:

(a) means to define at least a section of a cylindrical surface, the axis of said means (a) being stationary, (b) pressure means spaced outwardly from said cylindrical section, said means (a) and said pressure means cooperating with each other to squeeze said cylinders between said cylindrical section and said pressure means, with the axes of said cylinders parallel to the axis of said cylindrical section, said pressure means being flexible and being curved around said cylindrical section, (c) means to apply tension to said pressure means and thus effect said squeezing of said cylinders, (d) a plurality of separation means spaced along said cylinders and located to separate said cylinders into component cylinders while they are thus squeezed between said cylindrical section and said pressure means, and (e) means to effect relative rotational movement between said cylindrical section and said pressure means to thus effect positive, slip-free rolling of said cylinders therebetween, in the absence of any mandrels and with said cylinders in line contact with each other.

37. The invention as claimed in claim 36, in which said separation means are at least several axially-spaced power-driven diamond wheels.

38. The invention as claimed in claim 36, in which means are provided to adjust said tension.

39. The invention as claimed in claim 36, in which means are provided to shift the peripheral regions of said separation means into and out of the space between said cylindrical section and said pressure means, whereby a production run may be initiated by relaxing somewhat said tension on said pressure means.

40. The invention as claimed in claim 36, in which said means (a) is a drive roller having a cylindrical exterior surface the diameter of which is much greater than that of said cylinders, and in which said means (d) comprises means to rotate said drive roller.

41. Apparatus for subdividing elongated vitreous cylinders into discrete component cylinders of shorter lengths, comprising:

(a) supply means to supply elongated vitreous cylinders in parallel relationship to each other and in line contact with each other, (b) gripping and rolling means to sequentially positively grip said cylinders on the exterior surfaces thereof, and effect positive nonslipping rolling of said cylinders past a separation station for separation thereat, and furthermore to effect conjoint rolling of the component cylinders at least until full completion of separation, and (c) a plurality of separation means spaced predetermined distances from each other longitudinally of said cylinders, and adapted to separate said cylinders into said discrete component cylinders at said separation station.

42. The invention as claimed in claim 41, in which said separation means are grinding wheels containing particulate hard gemstones.

43. The invention as claimed in claim 42, in which said gripping and rolling means comprise a large-diameter power-driven cylindrical roller, and pressure means to force said cylinders tightly against said roller parallel thereto, and in which the peripheries of said grinding wheels lie in the path of said cylinders as they are rolled between said roller and said pressure means in response to driving of said roller.

44. The invention as claimed in claim 43, in which means are provided to relatively shift the peripheries of said grinding wheels to positions at which they can no longer effect said grinding.

45. The invention as claimed in claim 41, in which said supply means is a hopper, and in which agitator means in the form of rotating elements engage said cylinders directly and prevent or eliminate crossing thereof.

46. The invention as claimed in claim 43, in which said pressure means is a sheet bent partially around said roller, the ends of said sheet being under large tension such that the bent sheet region is forced toward the opposed roller region.

47. Apparatus for effecting precision subdividing of elongated glass cylinders, both hollow and solid, into component cylinders of predetermined shorter lengths, comprising:

(a) a power-driven drive roller having a generally cylindrical exterior portion adapted to sequentially engage and grip the exterior surfaces of said glass cylinders, (b) flexible means bent partially around said exterior portion, and cooperating therewith to bring large pressure to bear on those cylinders disposed between said flexible means and the opposed portions of said exterior surface, said means (a) and (b) cooperating with each other to effect positive slip-free rolling of said cylinders in the space between said drive roller and said exterior surface, (c) a supply hopper adapted to hold said cylinders in parallel relationship to each other and to said cylinders, said hopper being open at the bottom to feed said cylinders into said space, in response to driving of said drive roller by a motor means, and (d) at least several power-driven grinding wheels mounted for high-speed rotation adjacent said space, with the peripheral portions of said wheels in said space for grinding and thus subdividing said cylinders into discrete component cylinders as they roll through said space.

48. The invention as claimed in claim 47, in which said drive roller includes a rubber layer on its exterior, and defining said exterior cylindrical surface.

49. The invention as claimed in claim 47, in which the axis of said roller is stationary, in which said pressure means is a sheet bent partially around said roller, and in which means are provided to apply strong tension to the ends of said sheet to thus bias the bent portion thereof toward the roller for application of gripping pressure to said cylinders.

50. The invention as claimed in claim 49, in which said peripheral portions of said wheels extend through slots or gaps in said sheet.

51. The invention as claimed in claim 49, in which means are provided to effect precise adjustment of said tension.

52. The invention as claimed in claim 51, in which means are provided to shift said roller and sheet away from said wheels, whereby to permit initial loading of said space with cylinders at the start of a production run.

53. The invention as claimed in claim 47, in which water spray means are provided to direct water sprays against said roller, thereby removing chips therefrom and also aiding in discharge of the component cylinders therefrom.

54. The invention as claimed in claim 47, in which said flexible means (b) includes a highly tensioned backing sheet which forces a relatively soft rubber surface layer against said cylinders, said layer being interposed between said backing sheet and said cylinders.

55. A method of fully separating cylindrical glass tubes into predetermined discrete shorter tubes, which comprises:

(a) effecting sequential rolling of a multiplicity of parallel cylindrical glass tubes along a support, and (b) effecting, when each such tube reaches a predetermined station, simultaneous full separation of such tube into at least several discrete shorter component tubes, said separations being so performed that the end faces of said component tubes are substantially perpendicular to their axes.

* * * * *

UNITED STATES PATENT AND TRADEMARK OFFICE
CERTIFICATE OF CORRECTION

PATENT NO. : 4,112,627
DATED : September 12, 1978
INVENTOR(S) : Hendrik de Kanter It is certified that error appears in the above-identified patent and that said Letters Patent are hereby corrected as shown below:

Column 7, line 15, cancel "and" and substitute --- are ---.

Column 9, line 50, cancel "or" and substitute --- of ---.

Signed and Sealed this

Thirtieth Day of October 1979

[SEAL]

Attest:

RUTH C. MASON
Attesting Officer

LUTRELLE F. PARKER
Acting Commissioner of Patents and Trademarks